US012370801B2

(12) United States Patent
Esteoulle

(10) Patent No.: US 12,370,801 B2
(45) Date of Patent: Jul. 29, 2025

(54) PRINT HEAD COMPRISING A MAINTENANCE CIRCUIT AND COATING INSTALLATION

(71) Applicant: EXEL INDUSTRIES, Epernay (FR)

(72) Inventor: Daniel Esteoulle, Epernay (FR)

(73) Assignee: EXEL INDUSTRIES, Epernay (FR)

( * ) Notice: Subject to any disclaimer, the term of this patent is extended or adjusted under 35 U.S.C. 154(b) by 196 days.

(21) Appl. No.: 18/295,256

(22) Filed: Apr. 3, 2023

(65) Prior Publication Data

US 2023/0321984 A1 Oct. 12, 2023

(51) Int. Cl.
*B41J 2/165* (2006.01)
*B41J 2/14* (2006.01)

(52) U.S. Cl.
CPC ......... *B41J 2/16552* (2013.01); *B41J 2/1433* (2013.01)

(58) Field of Classification Search
CPC ............................ B41J 2/16552; B41J 2/1433
See application file for complete search history.

(56) References Cited

U.S. PATENT DOCUMENTS 5,877,788 A * 3/1999 Haan .................... B41J 2/16552 347/22
6,273,103 B1 8/2001 Enz et al.
2012/0280058 A1 11/2012 Gehrin
2019/0358958 A1* 11/2019 Usui .................... B41J 2/16552

OTHER PUBLICATIONS

FR 2203285, INPI Rapport de Recherche Preliminaire, Oct. 21, 2022, 2 pages.

* cited by examiner

*Primary Examiner* — Jason S Uhlenhake
(74) *Attorney, Agent, or Firm* — Soquel Group LLC

(57) ABSTRACT

A print head for applying a coating material to an object to be coated, the print head including a body wherein a plurality of nozzles are arranged, each including an ejection hole and an outlet channel opening into an ejection zone for ejecting the coating product via the ejection hole, as well as a coating product feeder circuit connected to the nozzle. The print head further includes a maintenance circuit for carrying a maintenance fluid and extending inside the body to the ejection zone of the nozzle. The maintenance circuit includes a plurality of internal channels each opening into the ejection zone of a single nozzle associated with the first internal channel. The number of first channels is equal to the number of nozzles.

20 Claims, 5 Drawing Sheets

PRINT HEAD COMPRISING A MAINTENANCE CIRCUIT AND COATING INSTALLATION

REFERENCE TO RELATED APPLICATION

This application is a U.S. non-provisional application claiming the benefit of French Application No. 22 03285, filed on Apr. 11, 2022, the contents of which are incorporated herein by reference in their entirety.

TECHNICAL FIELD OF THE INVENTION

The technical field of the invention is that of the application, by means of printing, of a coating product on an object to be coated.

The present invention relates more particularly to a print head for applying a coating product to an object to be coated and to a coating installation including the print head.

BACKGROUND OF THE INVENTION

The customization of decorations and coatings affixed to objects is becoming more and more frequent. This is the case, e.g., in the automotive industry, for vehicle body coatings. There can be coatings of one-color, two-tone or multi-color paints. Furthermore, the production of patterns with a specific geometry is interesting for other markets, in particular for visually differentiating two products according to the purpose thereof or the manufacture thereof. In such context, the coating industry has recently explored solutions of "printing" paint using print heads, rather than spraying the paint with sprayers.

The paints used to produce coatings by printing have viscosities on the order of 50 to 200 millipascal-second (MPAs) and contain pigment particles with dimensions on the order of one micrometer. To apply such paints, a print head equipped with a plurality of nozzles is usually used. The print head is, e.g., mounted on the arm of a multi-axis robot. Each nozzle includes an outlet channel opening out to the outside via an ejection hole of small diameter, typically on the order of 100 μm to 200 μm, which is much smaller than the dimensions of a sprayer outlet hole (generally greater than 800 μm).

Given the small diameter of the nozzle ejection holes, there is a risk of clogging the nozzles with paint residues. Nozzle cleaning operations are thus performed between the printing phases so as to prevent nozzle clogging and maintain good print quality.

Moreover, for economy and practical reasons, the same print head is generally used for applying paints of different colors. Hence, each nozzle has to be cleaned during a change of paint.

Patent application EP3725421A1 describes an installation for applying a coating product including a print head equipped with a set of nozzles and a nozzle cleaning station. The cleaning station includes a plurality of injectors designed for simultaneously cleaning a plurality of nozzles, by injecting a cleaning fluid into the outlet channels of the nozzles, through the ejection holes thereof.

When it is necessary to clean the nozzles, e.g., in anticipation of a change of paint color, the print head is moved by the multi-axis robot to be positioned above the cleaning station.

In order to maximize the printing time, and thus the production rate, it would be advantageous to fit the cleaning station with the print head on the arm of the multi-axis robot. The EP3725421A1 Document Cleaning Station is, however, too large to be fitted along with the print head and to be compatible with the short print distance; i.e., the distance between the nozzles and the object to be coated.

It is also known from U.S. Pat. No. 5,877,788A how to clean the nozzles of a print head with a fluid conveyed by channels common to all the nozzle ejection holes. The ejection holes situated near the outlet of the channels are cleaned before and with a cleaner fluid than the channels situated far from the outlet. The cleaning of the nozzle ejection zones is thus not homogeneous.

SUMMARY OF THE INVENTION

There is thus a need to be able to homogeneously clean different nozzles of a print head when the print head is in position for printing; i.e., in the vicinity of the object to be coated.

According to a first aspect of the invention, such need tends to be met by providing a print head for applying a coating product to an object to be coated, the print head including a body wherein are fitted:

- a plurality of nozzles each including an ejection hole and an outlet channel opening into an ejection zone of the coating product through the ejection hole;
- a feeder circuit for coating product, connected to the nozzle; the print head further includes a maintenance circuit for conveying a maintenance fluid, the maintenance circuit extending inside the body to the nozzle ejection zone and including a first internal channel opening into the ejection zone of at least one nozzle. According to the invention, the maintenance circuit includes a plurality of first internal channels, each first internal channel opening into the ejection zone of only one nozzle associated with the first internal channel, the number of first internal channels being equal to the number of nozzles.

The maintenance circuit conveys the maintenance fluid into the ejection zone of each nozzle or, on the contrary, discharges the maintenance fluid from the ejection zone, and thus cleans the ejection holes of the nozzles, in an individualized and homogeneous manner. The maintenance circuit thus provides a cleaning solution which is integrated into the print head and which is not bulky like the solutions of the prior art, and is more efficient. Cleaning may thus be carried out when the print head is in position for printing.

In one embodiment of the print head, the maintenance circuit further includes a plurality of second internal channels, each second internal channel being associated with a first internal channel and opening into the ejection zone of the only one nozzle associated with the first internal channel. Such embodiment combines practicality (many possible maintenance operations) and cleaning performance.

According to a development of the embodiment, each second internal channel is situated opposite the associated first internal channel with respect to the ejection hole of the nozzle in the ejection zone from which the second channel opens out. Such arrangement of the first and second internal channels improves the cleaning of the ejection hole and facilitates the flow of the maintenance fluid.

According to another development compatible with the preceding development, each first internal channel and associated second internal channel are oriented along the same direction. Such arrangement further facilitates the flow of the maintenance fluid.

In another embodiment, the maintenance circuit includes a first maintenance fluid storage chamber, the first storage chamber communicating with the nozzle ejection zone through a first opening.

According to a development of the third embodiment, the print head includes a plurality of nozzles connected to the feeder circuit, each nozzle including an ejection hole and an outlet channel opening into an ejection zone, and the first storage chamber for the maintenance fluid communicates with the ejection zone of a plurality of nozzles (preferably of all nozzles) through a plurality of first openings.

According to another development compatible with the previous development, the maintenance circuit further includes a second chamber for storing the maintenance fluid, the second storage chamber communicating with the ejection zone of the nozzle or of a plurality of nozzles (preferably of all nozzles) through one or a plurality of second openings.

In addition to the features just mentioned in the preceding paragraphs, the print head according to the first aspect of the invention may have one or a plurality of complementary features among the following, considered individually or in all technically possible combinations:

- the first internal channel is directed toward the nozzle ejection hole;
- the print head includes an ejection face wherein the ejection hole of a nozzle of the plurality of nozzles is fitted;
- each first internal channel is arranged so that the maintenance fluid flows in contact with the ejection face;
- each first internal channel is oriented parallel to the ejection face;
- each first internal channel is inclined with respect to the ejection face towards the nozzle ejection hole;
- each first internal channel is fitted in a plate arranged on the ejection face of the print head;
- each first internal channel has an end open to the ejection zone and situated at a distance less than or equal to 1 mm from the ejection hole of a nozzle of the plurality of nozzles;
- the maintenance circuit includes a first chamber for storing the maintenance fluid, the first storage chamber communicating with the ejection zone of each nozzle through one of the first internal channels, the length of which is between 0.5 mm and 10 mm;
- the maintenance circuit further includes a first maintenance fluid storage chamber, the first internal channel connecting the first storage chamber for the maintenance fluid to the nozzle ejection zone;
- the first internal channels or openings extend through an internal wall of the body which separates the first storage chamber and the nozzle ejection zones;
- the first internal channels are provided in an external maintenance plate arranged on an ejection face of the body, wherein are provided the ejection holes of the nozzles;
- the first internal channel extends through an internal wall separating the first storage chamber for the maintenance fluid and the nozzle ejection zone;
- the first internal channels have a cross-section with characteristic dimensions less than or equal to 0.5 mm, preferably less than or equal to 0.25 mm;
- the second internal channel is directed towards the nozzle ejection hole;
- the second internal channel is arranged so that the maintenance fluid flows in contact with the ejection face;
- the second internal channel is oriented parallel to the ejection face;
- the second internal channel is inclined with respect to the ejection face towards the nozzle ejection hole;
- the second internal channel is fitted in a plate arranged on the ejection face of the print head;
- the second internal channel has one end open to the ejection zone and situated at a distance less than or equal to 1 mm from the ejection hole of the nozzle;
- the maintenance circuit further includes a second storage chamber for storing the maintenance fluid, the second internal channel connecting the second storage chamber to the ejection zone of the nozzle;
- the second internal channel extends through an internal wall separating the second storage chamber for the maintenance fluid and the nozzle ejection zone;
- the second internal channel further extends partially into the second storage chamber for the maintenance fluid; and
- the coating product feeder circuit includes a storage chamber for the coating product and a plurality of dispensing channels connecting the storage chamber for the coating product to the nozzles.

A second aspect of the invention relates to a coating installation including:

- a print head according to the first aspect of the invention;
- an injection circuit for the maintenance fluid, connected to at least one inlet of the print head; and
- a suction circuit for the maintenance fluid, connected to at least one outlet of the print head.

Advantageously, the suction circuit includes:

- a vacuum generator;
- a first suction valve connected to the vacuum generator and to a first outlet of the print head; and
- a second suction valve connected to the vacuum generator and to a second outlet of the print head.

In one embodiment, the first outlet of the print head is merged with a first inlet-outlet of the maintenance circuit, and the second outlet of the print head is merged with a supply inlet of the feeder circuit.

In a variant embodiment, the first outlet of the print head is merged with a first inlet-outlet of the maintenance circuit, and the second outlet of the print head is merged with a second inlet-outlet of the maintenance circuit.

Advantageously, the injection circuit includes:

- a first pressurized tank containing a cleaning fluid;
- a second pressurized tank containing a wetting liquid;
- a first injection valve connected to the first and second pressurized tanks and to a first inlet of the print head; and
- a second injection valve connected to the first and second pressurized tanks and to a second inlet of the print head.

In one embodiment, the first inlet of the print head is merged with a first inlet-outlet of the maintenance circuit, and the second inlet of the print head is merged with a supply inlet of the feeder circuit.

In a variant embodiment, the first inlet of the print head is merged with a first inlet-outlet of the maintenance circuit, and the second inlet of the print head is merged with a second inlet-outlet of the maintenance circuit.

BRIEF DESCRIPTION OF THE DRAWINGS

Other features and advantages of the invention will be clear from the description thereof which is given below as a non-limiting example, with reference to the enclosed figures, among which.

For greater clarity, identical or similar elements are identified by identical reference signs in all the figures.

DETAILED DESCRIPTION

Figure 1A:
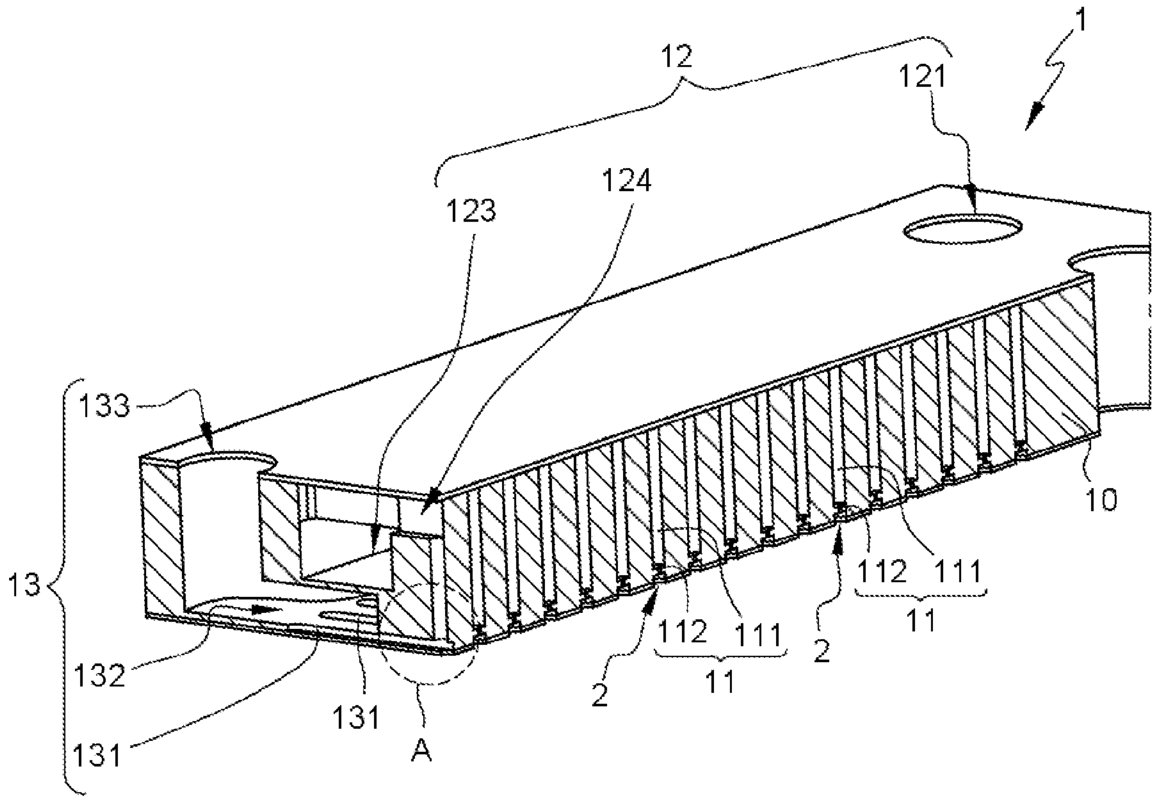
FIGS. 1A and 1B show a first embodiment of a print head according to the first aspect of the invention.
Figure 1B:
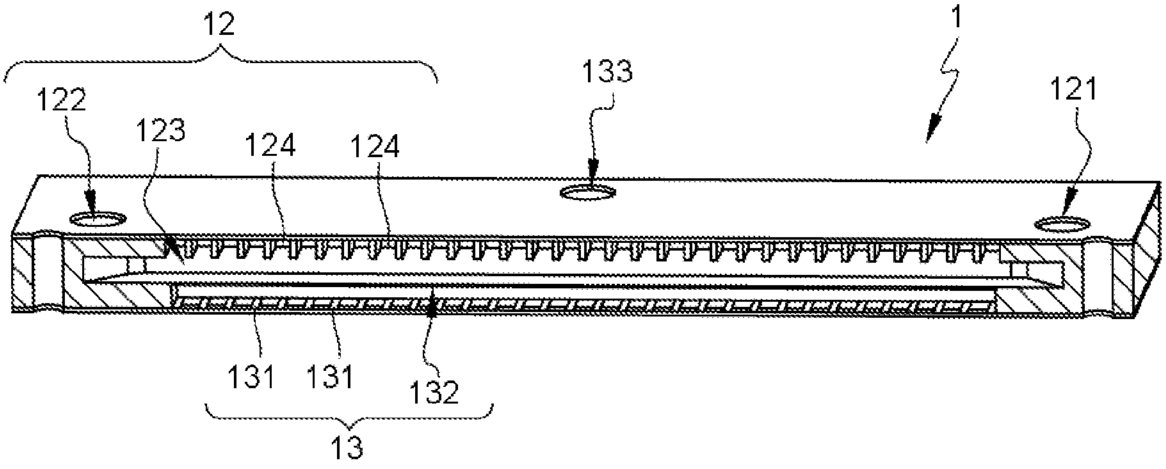

FIGS. 1A and 1B are partial three-dimensional views of a print head 1 according to a first embodiment of the present invention. The view shown in FIG. 1A results from a section of print head 1 along a transverse plane and along a first longitudinal plane. The partial view shown in FIG. 1B results from a section of print head 1 along a second longitudinal plane parallel to the first longitudinal plane. These figures thus show internal elements of print head 1.

Print head 1 includes a body 10 and a plurality of nozzles 11 situated inside body 10. Preferably, nozzles 11 are arranged in one or a plurality of rows. For simplicity, only one row of nozzles 11 is shown in FIG. 1A (the first longitudinal section plane passing through the row of nozzles). The number of nozzles 11 in each row may be between 2 and 500.

Print head 1 is intended for applying a coating product over an object to be coated; e.g., a body of a motor vehicle. Print head 1 preferably works according to drop on demand (DOD) technology. Each nozzle 11 is then configured for depositing the coating product drop by drop. To this end, each nozzle 11 may be equipped with a valve which is controlled for opening or closing, and for allowing or preventing respectively, the coating product from flowing through nozzle 11. The valves of nozzles 11 are, e.g., pneumatic valves each including a membrane which may be controlled. Such a valve is pneumatically controlled (e.g., using compressed air). The valves of nozzles 11 may also be solenoid valves.

Alternatively, print head 1 is a continuous jet print head; i.e., print head 1 has permanently open circuits. In such a case, nozzles 11 do not have valves.

The coating product taken hereinafter as an example is paint, but the coating product may also be a primer, a varnish or a more viscous product such as a glue or a putty.

Figure 2:
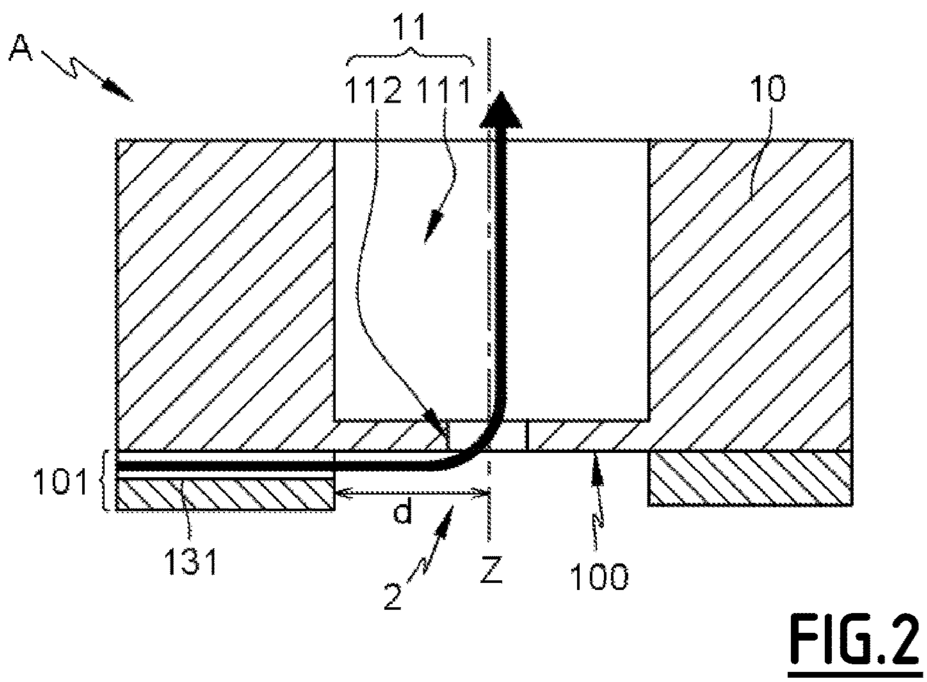
FIG. 2 shows on a larger scale a nozzle of the print head shown in FIGS. 1A and 1B, and a maintenance channel associated with the nozzle.

FIG. 2 is a sectional view on a larger scale of a portion A of print head 1, the portion A being situated around a nozzle 11 (cf. FIG. 1A). Portion A will be described jointly with FIGS. 1A and 1B.

Each nozzle 11 includes an outlet channel 111 and an ejection hole 112. Outlet channel 111 opens out to the outside of body 10 via ejection hole 112, in a paint ejection zone 2. Each nozzle 11 is thus associated with an ejection zone 2 which extends in the continuation of outlet channel 111 of nozzle 11.

Outlet channel 111 and ejection hole 112 of nozzles 11 are fitted into body 10 of the print head 1. More particularly, ejection hole 112 is fitted into an ejection face 100 of body 10. Ejection hole 112 has a diameter which may be between 100 μm and 500 μm, e.g., equal to 150 μm. Ejection face 100 partly delimits ejection zones 2. The ejection axis z of each nozzle 11, defined as the axis of ejection hole 112, is preferably oriented perpendicularly to ejection face 100.

Print head 1 further includes two internal fluid circuits; i.e., fitted inside body 10:

- a feeder circuit 12 connected to nozzles 11 and intended for conveying the paint;
- a maintenance circuit 13 intended for conveying a maintenance fluid.

The function of feeder circuit 12 is to feed paint into nozzles 11. Feeder circuit 12 includes a so-called supply inlet 121 and extends inside body 10 from supply inlet 121 to nozzles 11. Supply inlet 121 is an inlet through which paint enters print head 1. Feeder circuit 12 may also include a so-called purge or recirculation outlet 122 (cf. FIG. 1B). Purge outlet 122 is an outlet through which paint may be discharged from print head 1 (and conveyed to recovery and processing manifolds or to the feeder tanks). Purge outlet 122 is used for purging feeder circuit 12, e.g., when changing paint color. Feeder circuit 12 may also be primed; i.e., filled with paint before a printing phase, by circulating paint from supply inlet 121 to purge outlet 122 (but not through nozzles 11). Supply inlet 121 and purge outlet 122 are fitted into an outer wall of body 10.

As shown in FIGS. 1A and 1B, feeder circuit 12 may further include a storage chamber 123 (for paint) connected to supply inlet 121 and a plurality of dispensing channels 124 (for paint) connecting storage chamber 123 to nozzles 11. Advantageously, storage chamber 123 is further connected to purge outlet 122. Two elements of the same fluidic circuit (or two elements belonging to two different fluidic circuits) are considered to be connected when they are in fluidic communication.

Each dispensing channel 124 may connect storage chamber 123 to one or a plurality of nozzles 11, e.g., two consecutive nozzles in the row. Preferably, the number of dispensing channels 124 is equal to the number of nozzles 11, and each dispensing channel 124 serves only one nozzle 11.

Storage chamber 123 and dispensing channels 124 are fitted in body 10. Supply inlet 121 and purge outlet 122 may open directly into storage chamber 123, or may be connected to storage chamber 123 by so-called inlet and outlet conduits, respectively.

Maintenance circuit 13 extends inside body 10 as far as ejection zone 2 of at least some of nozzles 11, preferably all of nozzles 11. Maintenance circuit 13 is configured for conveying maintenance fluid to ejection zone 2 of at least some of nozzles 11 and/or to discharge the maintenance fluid from ejection zone 2 from at least some of nozzles 11 (preferably all of nozzles 11).

In such first embodiment, maintenance circuit 13 includes a plurality of first internal channels 131, called maintenance channels. One or a plurality of nozzles 11 are associated with each first internal channel 131. Each first internal channel 131 opens into ejection zone 2 of the nozzle(s) associated with first internal channel 131.

Maintenance circuit 13 is advantageously configured so that maintenance fluid may be brought into each ejection zone 2 or discharged from each ejection zone 2 via at least one first internal channel 131. All nozzles 11 of print head 1 may thus be serviced.

Advantageously, the number of first internal channels 131 is equal to the number of nozzles 11 and each first internal channel 131 opens into ejection zone 2 of only one nozzle 11 (in other words, each first internal channel 131 is associated with only one nozzle 11). Maintenance is thus carried out in the same way and with the best performance level for all nozzles.

In addition to first internal channels 131, maintenance circuit 13 includes a first storage chamber 132 for maintenance fluid, and a first inlet-outlet 133. An inlet-outlet herein refers to an inlet and/or outlet hole for maintenance fluid in print head 1. First inlet-outlet 133 may open directly into first storage chamber 132, or may be connected by a conduit to first storage chamber 132. First inlet-outlet 133 is fitted into an external wall of body 10. First storage chamber 132 (also called the first distribution chamber for maintenance fluid) is connected to ejection zones 2 by first internal channels 131.

Thus, maintenance circuit 13 herein extends from first inlet-outlet 133 to ejection zones 2 of nozzles 11.

Each first internal channel 131 extends through an internal wall separating first storage chamber 132 and ejection zones 2 from nozzles 11. Each first internal channel 131 may further extend partially into first storage chamber 132, as shown in FIG. 1A.

Maintenance circuit 13 makes it possible to carry out maintenance operations on print head 1. In the first embodiment, the possible maintenance operations are the following:

- a cleaning operation (or rinsing) of at least a part of nozzles 11 and at least a portion of supply circuit 12, using a cleaning fluid; and
- a wetting operation of at least a part of nozzles 11, using a non-volatile liquid.

Thus, the nature of the maintenance fluid varies according to the desired maintenance operation.

Such operations are described in more detail in the preferable case of simultaneous maintenance of all nozzles 11 of print head 1.

The operation of cleaning nozzles 11 and at least a part of feeder circuit 12 consists in removing paint residues situated in nozzles 11 (typically in outlet channel 111 and ejection hole 112) and in feeder circuit 12.

Cleaning fluid may be brought into ejection zone 2 of nozzles 11 by means of first internal channels 131 of maintenance circuit 13, then be discharged by passing through nozzles 11 and feeder circuit 12 (cf. FIG. 2). Cleaning fluid then flows through nozzles 11 in the opposite direction to the direction of flow of paint, which is also called the normal direction of flow. Conversely, cleaning fluid may be brought into ejection zone 2 by passing through nozzles 11 by means of feeder circuit 12, then be evacuated from ejection zone 2 by first internal channels 131 of maintenance circuit 13. Cleaning fluid then flows through nozzles 11 in the normal direction of flow. Cleaning fluid may be a liquid (whether volatile or not), a gas (e.g., air) or a mixture of liquid and gas. Cleaning liquid advantageously includes a solvent (in order to “dissolve” the dry paint residues), preferably the same solvent as the solvent used in composition of the paint.

Such an operation may be carried out for unblocking the obstructed nozzles 11 and for re-establishing optimum operation (in particular, for guaranteeing repeatable drop trajectories). This operation may also be carried out between two phases of printing the object, during a change of color of paint, or after a prolonged stop of print head 1. Feeder circuit 12 is advantageously drained prior to such operation.

A wetting operation of nozzles 11 consists in forming a film of non-volatile liquid at the level of ejection hole 112 of nozzles 11, in order to prevent paint from drying during a prolonged stop of printing and from obstructing nozzles 11. Non-volatile liquid, also called wetting liquid or stopping liquid, may be brought to ejection hole 112 of nozzles 11 via first internal channels 131 at the end of a printing phase, and then discharged before the next printing phase begins, either through feeder circuit 12 or through first internal channels 131. Alternatively, wetting liquid may be brought to ejection hole 112 of nozzles 11 through feeder circuit 12, then discharged through feeder circuit 12 or through first internal channels 131.

Thus, maintenance circuit 13 carries only one or a plurality of maintenance fluids (cleaning fluid and/or wetting liquid), unlike feeder circuit 12 which may receive paint and maintenance fluids.

Maintenance fluid is sucked in so as to be discharged from ejection zone 2 of nozzles 11. First internal channels 131—or nozzles 11 and feeder circuit 12—are thus subjected to a negative pressure. The negative pressure is preferably between 0.1 bar and 0.8 bar, e.g., equal to 0.5 bar. Maintenance fluid is injected into print head 1 at a pressure which may be between 0.1 bar and 1 bar.

Values of pressure and of negative pressure depend on the type of operation desired and on the properties of the maintenance fluid. For a cleaning operation, e.g., it is advantageous to circulate fluid rapidly in ejection zone 2 and thus to have high pressure/negative pressure values. For a nozzle wetting operation, wetting liquid is slowly brought into ejection zone 2 so as to form the wet film which will close the nozzle.

First storage chamber 132 is preferably arranged for providing identical pressure/negative pressure along print head 1, and thus to ensure identical operation for all nozzles 11.

By virtue of first internal channels 131 opening into ejection zone 2 of nozzles 11, maintenance operations may be carried out without external flow, when print head 1 is in position for printing; i.e., in the immediate vicinity of the object to be coated. It then becomes possible to dispense with a recovery tray.

With reference to FIG. 2, first internal channel 131 may be arranged so that maintenance fluid flows in contact with ejection face 100. Ejection face 100 may thus be cleaned and cleared of paint residues between the end of first internal channel 131 and ejection hole 112 of the associated nozzle (s) 11. First internal channel 131 preferably includes a wall forming a plane surface with ejection face 100, as illustrated. First internal channel 131 is oriented, e.g., parallel to ejection face 100.

In another configuration, not shown in the figures, first internal channel 131 is inclined with respect to ejection face 100 towards ejection hole 112 of the nozzle(s) associated with first internal channel 131.

First internal channel 131 opens into ejection zone 2 at a distance d from the axis z of ejection hole 112, which is advantageously less than or equal to 1 mm, e.g., equal to 0.25 mm. A small distance d between the end of first internal channel 131 and ejection hole 112 improves cleaning or wetting of the ejection hole (by limiting dispersion of the jet of fluid) and facilitates suction of maintenance fluid.

First internal channel 131 preferably has a cross-section with characteristic dimensions less than or equal to 0.5 mm, preferably less than or equal to 0.25 mm. Such section is, e.g., round (diameter less than or equal to 0.5 mm) or rectangular (height and width less than or equal to 0.5 mm).

The length of first internal channel 131 may be between 0.5 mm and 10 mm. Such a length makes it possible to properly "guide" maintenance fluid to ejection zone 2.

Preferably, all first internal channels 131 of maintenance circuit 13 have the same configuration and the same dimensions. In other words, same are identical.

First internal channels 131 are advantageously arranged in a plate (or layer) 101 called an external maintenance plate, and arranged on ejection face 100. External maintenance plate 101 has a very small thickness, e.g., between 0.1 mm and 1 mm, and thus does not significantly increase the bulk of print head 1.

Figure 3:
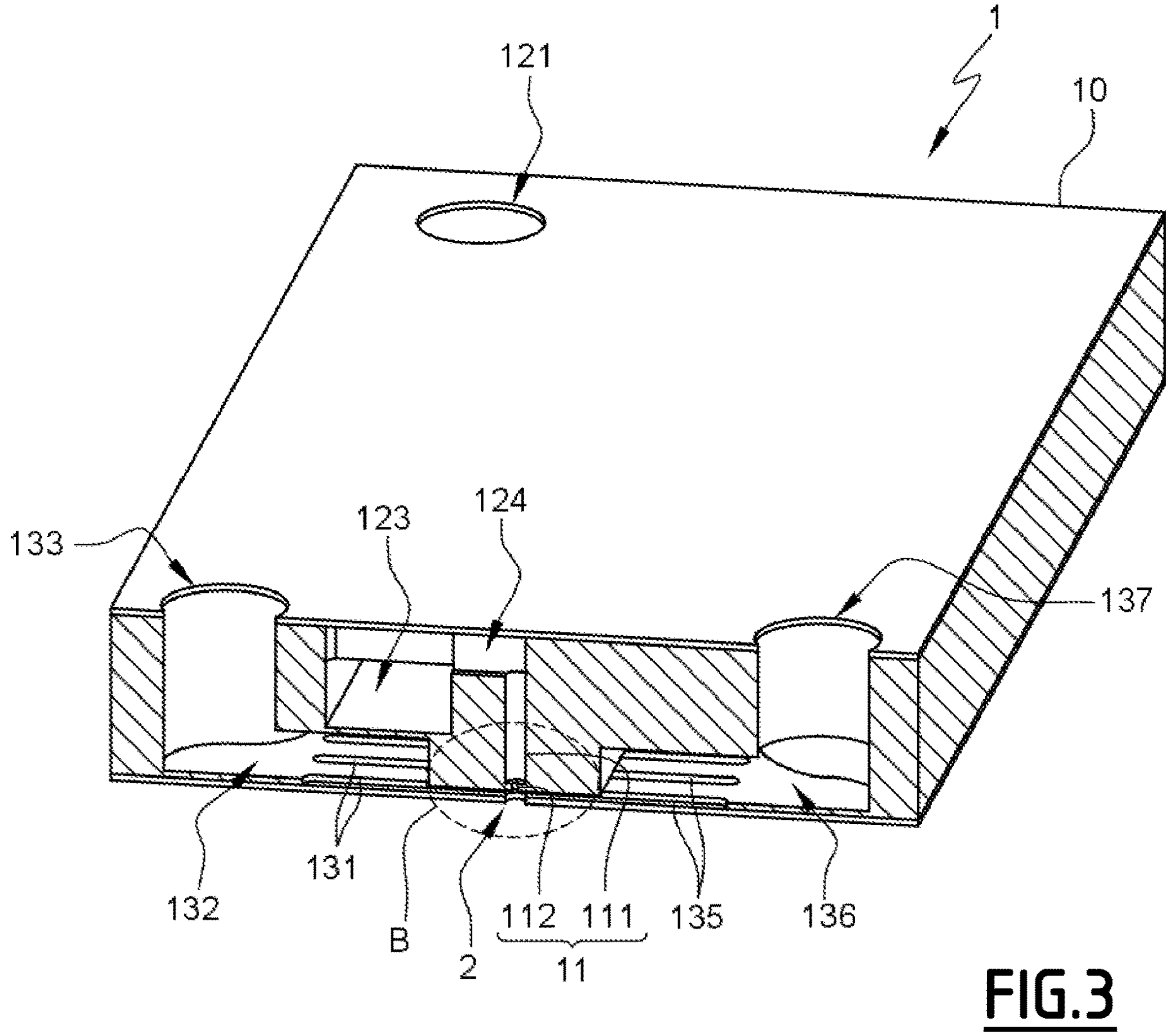
FIG. 3 shows a second embodiment of a print head according to the first aspect of the invention.

FIG. 3 is a partial three-dimensional view of print head 1 according to a second embodiment. FIG. 3 results from a section of print head 1 along a transverse plane.

Print head 1 according to the second embodiment (FIG. 3) differs from print head 1 according to the first embodiment (FIGS. 1A and 1B) essentially in the arrangement of maintenance circuit 13.

In the second embodiment, maintenance circuit 13 includes, in addition to first internal channels 131, second internal channels 135. Each second internal channel 135 is associated with a first internal channel 131 and opens into ejection zone 2 of the nozzle(s) 11 associated with first internal channel 131.

Like first internal channels 131, second internal channels 135 serve for conveying maintenance fluid to ejection zones 2, or for discharging maintenance fluid from ejection zones 2.

Advantageously, the number of second internal channels 135 is equal to the number of nozzles 11, and each second internal channel 135 opens into ejection zone 2 of only one nozzle 11; i.e., each second internal channel 135 is associated with only one nozzle 11.

Maintenance circuit 13 further includes a second storage (or distribution) chamber 136 for maintenance fluid and a second inlet-outlet 137 connected to second storage chamber 136. Second inlet-outlet 137 may be fitted into an external wall of body 10 and open directly into second storage chamber 136, or may be connected by a conduit to second storage chamber 136. Second storage chamber 136 is preferably arranged for providing identical pressure/negative pressure along print head 1, thus to ensure identical operation for all nozzles 11.

Maintenance circuit 13 herein extends from first inlet-outlet 133 to ejection zones 2 of nozzles 11, and from ejection zones 2 to second inlet-outlet 137.

Second internal channels 135 connect second storage chamber 136 to ejection zones 2 of nozzles 11. Each second internal channel 135 extends through an internal wall separating second storage chamber 136 and ejection zones 2 from nozzles 11. Each second internal channel 135 may further extend partially into second storage chamber 136, as shown in FIG. 3.

Figure 4:
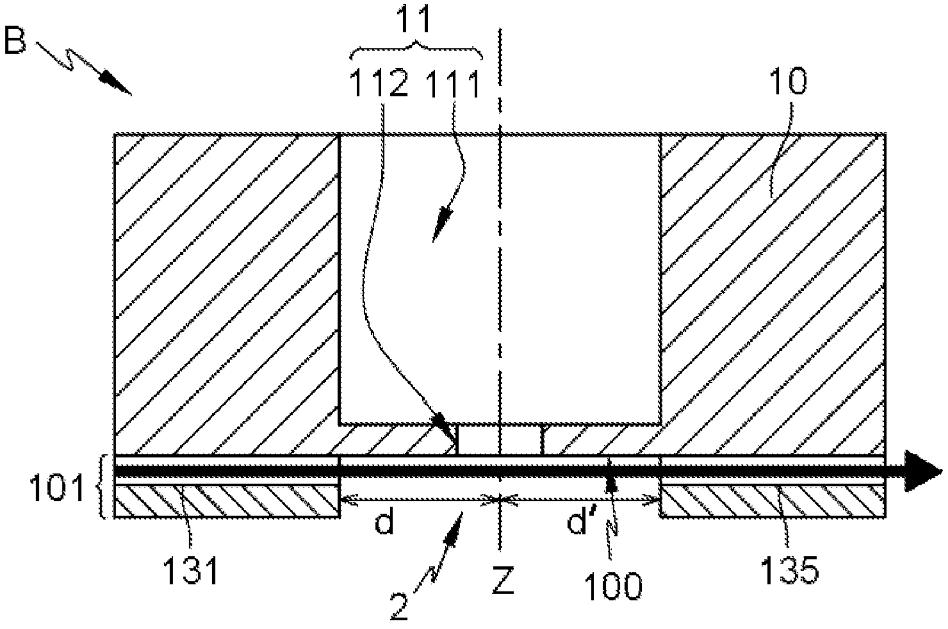
FIG. 4 shows on a larger scale a nozzle of the print head shown in FIG. 3, and two maintenance channels associated with the nozzle.

FIG. 4 is a sectional view on a larger scale of a portion B of print head 1, portion B being situated around a nozzle 11 (cf. FIG. 3). FIG. 4 shows a preferably arrangement of first internal channel 131 and of associated second internal channel 135.

Second internal channel 135 is situated opposite associated first internal channel 131 with respect to ejection hole 112 of nozzle 11. Second internal channel 135 may be arranged so that maintenance fluid flows in contact with ejection face 100, as described hereinabove in relation to first internal channel 131 (FIG. 2). In such configuration, first internal channel 131 and second internal channel 135 are advantageously oriented along the same direction.

Alternatively, second internal channel 135 may be inclined with respect to ejection face 100 towards ejection hole 112.

Second internal channel 135 opens into ejection zone 2 at a distance d' from the axis z of ejection hole 112, which is advantageously less than or equal to 1 mm, e.g., equal to 0.25 mm. The distance d' between the end of second internal channel 135 and the axis z of ejection hole 112 is preferably equal to the distance d between the end of first internal channel 131 and the axis z of ejection hole 112.

Second internal channel 135 preferably has a cross-section with characteristic dimensions less than or equal to 0.5 mm, preferably less than or equal to 0.25 mm. Such section is, e.g., round (diameter less than or equal to 0.5 mm) or rectangular (height and width less than or equal to 0.5 mm). The length of second internal channel 135 may be between 0.5 mm and 10 mm.

First internal channel 131 and second internal channel 135 may be arranged symmetrically with respect to ejection hole 112 of nozzle 11.

Preferably, all second internal channels 135 of maintenance circuit 13 have the same configuration and the same dimensions. Second internal channels 135 are thus identical.

Second internal channels 135 are advantageously fitted into the same external maintenance plate 101 as first internal channels 131.

The following maintenance operations are possible with print head 1 according to the second embodiment:

- an operation of cleaning at least a part of nozzles 11, and of at least a part of supply circuit 12, using a cleaning fluid;
- a wetting operation of at least a part of nozzles 11, using a non-volatile liquid; and
- an operation of cleaning ejection face 100 and the ejection hole of at least a part of nozzles 11, using a cleaning fluid.

The operation of cleaning at least a part of nozzles 11 and of at least a part of feeder circuit 12, and the wetting operation, have been described hereinabove. Second internal channels 135 may perform the same function as first internal channels 131; i.e., suction or injection of maintenance fluid. Second internal channels 135 may, e.g., be used for discharging maintenance fluid from ejection zones 2 after maintenance fluid has circulated through feeder circuit 12 and nozzles 11. Alternatively, second internal channels 135 may perform a different function from the function of first internal channels 131. As an example, second internal channels 131 may serve for sucking up wetting liquid, whereas first internal channels 131 serve for bringing wetting fluid to ejection zones 2.

The operation of cleaning ejection face 100 and the ejection hole of nozzles 11 includes conveying cleaning fluid to ejection zones 2 via first internal channels 131, and discharging cleaning fluid via second internal channels 135, or vice versa. Thus, during such operation, cleaning fluid circulates only through maintenance circuit 13 (between first and second inlet-outlets 133, 137) and in ejection zones 2, in contact with ejection face 100.

Since first internal channel 131 and second internal channel 135 are situated on either side of ejection zone 2 (and preferably situated opposite each other), a more thorough cleaning of ejection face 100 may be obtained.

Print head 1 according to the second embodiment thus makes it possible to carry out an additional maintenance operation. Values of pressure and negative pressure are similar to the values previously indicated. The implementation is easier because maintenance is completely decorrelated from the feed (valves removed from the circuit).

In another embodiment of print head 1, not shown in the figures, maintenance circuit 13 includes a single first internal channel 121 opening into ejection zone 2 of a plurality of nozzles 11, preferably all nozzles 11.

However, a maintenance circuit 13 including a plurality of first internal channels 131 has better performance (in terms of cleaning the nozzles, e.g.) than a maintenance circuit 13 with only one first internal channel common to a plurality of nozzles. In fact, maintenance fluid may thus be conveyed to nozzle ejection zone 2 or removed from nozzle ejection zone 2 in a more precise manner. Multiplying the number of first internal channels 131 further reduces the size thereof, and thus increases the speed of maintenance fluid circulating inside.

Similarly, maintenance circuit 13 may include (in addition to first internal channel or channels 131) only one second internal channel 135 opening out in ejection zone 2 of a plurality of nozzles 11, preferably all the nozzles 11.

Figure 5:
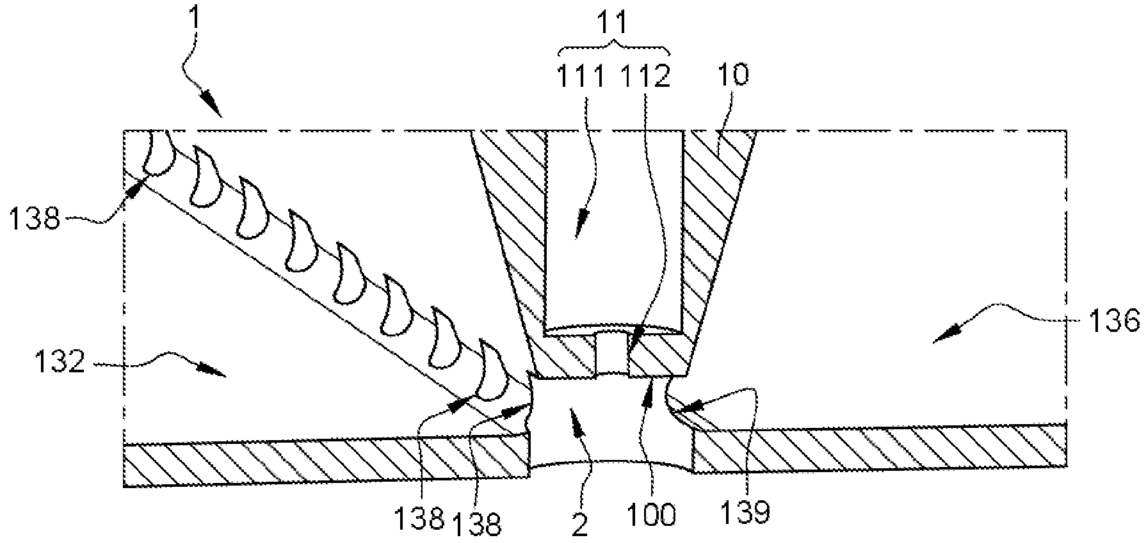
FIG. 5 shows a third embodiment of a print head according to the first aspect of the invention.

FIG. 5 shows a third embodiment, wherein maintenance circuit 13 of print head 1 has no first internal channels 131 and no second channels 135. First storage chamber 132 communicates with ejection zone 2 of at least a portion of nozzles 11 via one or a plurality of first openings 138.

Preferably, first storage chamber 132 communicates with ejection zone 2 of each of nozzles 11 via a single first opening 138. The number of first openings 138 is then equal to the number of nozzles 11.

First openings 138 are fitted in the wall of body 10 which separates first storage chamber 132 and ejection zones 2. Same result from the overlap between first storage chamber 132 and ejection zones 2 (herein in the form of straight cylinders, in the continuation of outlet channels 111 of nozzles 11).

Furthermore, second storage chamber 136 communicates with ejection zone 2 of at least a portion of nozzles 11 via one or a plurality of second openings 139. Preferably, second storage chamber 136 communicates with ejection zone 2 of each of nozzles 11 via a single second opening 139. The number of second openings 139 is then equal to the number of nozzles 11.

Second openings 139 are fitted in the wall of body 10 which separates second storage chamber 136 and ejection zones 2. Same result from the overlap between second storage chamber 136 and ejection zones 2.

Thus, a nozzle 11 and a first opening 138 may be associated with each second opening 139. Each second opening 139 is advantageously situated opposite the associated first opening 138 with respect to ejection hole 112 of the associated nozzle 11. In other words, first opening 138, second opening 139, and the end of ejection hole 112 are aligned. Such arrangement improves cleaning and wetting of ejection hole 111 of nozzle 11. Furthermore, first and second openings 138 and 139 are advantageously arranged so that maintenance fluid flows in contact with ejection face 100.

Compared with the first and second embodiments (FIGS. 1A, 1B and 2; FIGS. 3 and 4), first and second openings 138 and 139 may be considered to be (first and second) internal channels of zero length.

Print head 1 shown in FIG. 5 works in the same way as print head 1 shown in FIG. 3, the other elements, not mentioned, being otherwise identical.

According to a variant of such third embodiment, the maintenance circuit does not have a second storage chamber 136. Print head 1 then works in the same way as print head 1 shown in FIGS. 1A and 1B.

Finally, in another embodiment, print head 1 includes only one nozzle 11, a first internal channel 131 opening into ejection zone 2 of nozzle 11 (as described in relation to FIG. 2) or a first opening 138 and, advantageously, a second internal channel 132 opening into ejection zone 2 of nozzle 11 (as described in relation to FIG. 4) or a second opening 139. Feeder circuit 12 then includes only one dispensing channel 124 connecting storage chamber 123 to nozzle 11.

Figure 6:
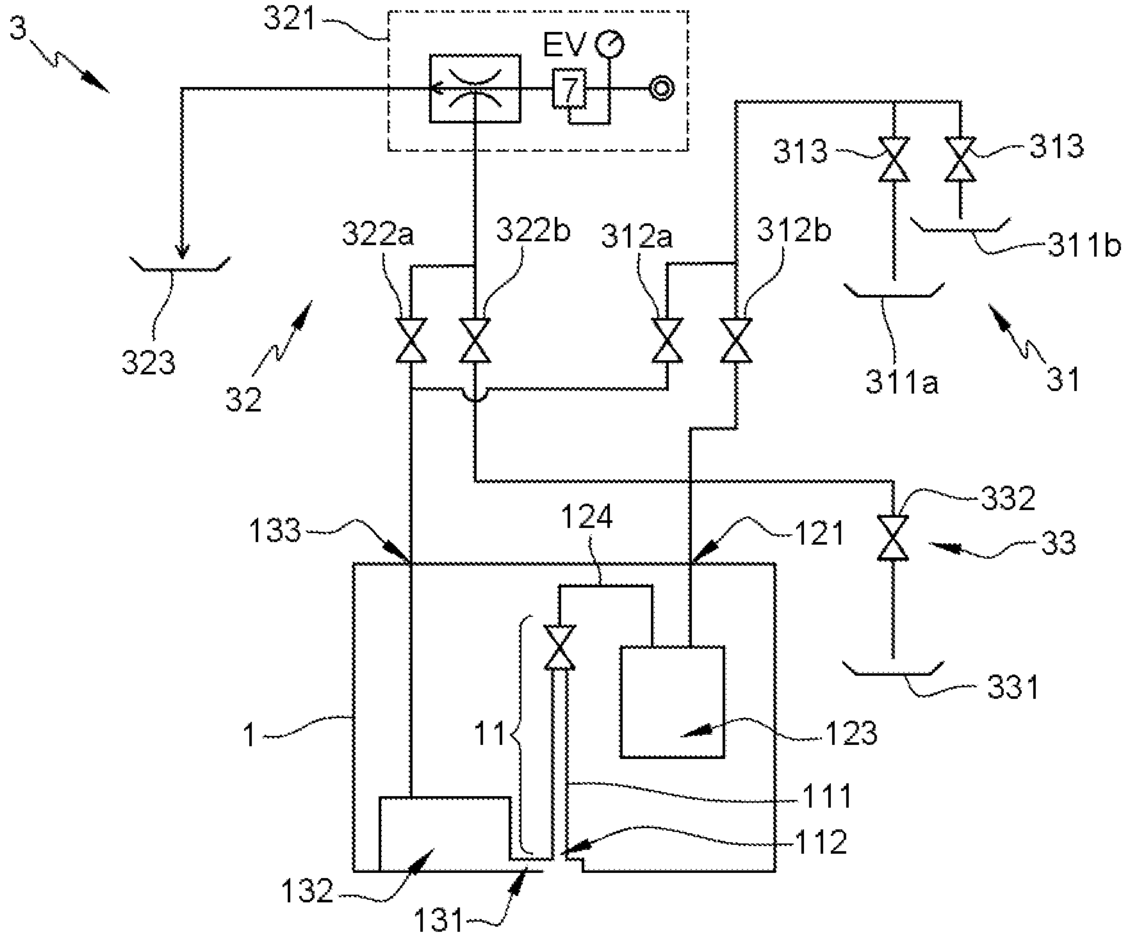
FIG. 6 schematically represents a first embodiment of a coating installation according to the second aspect of the invention.
Figure 7:
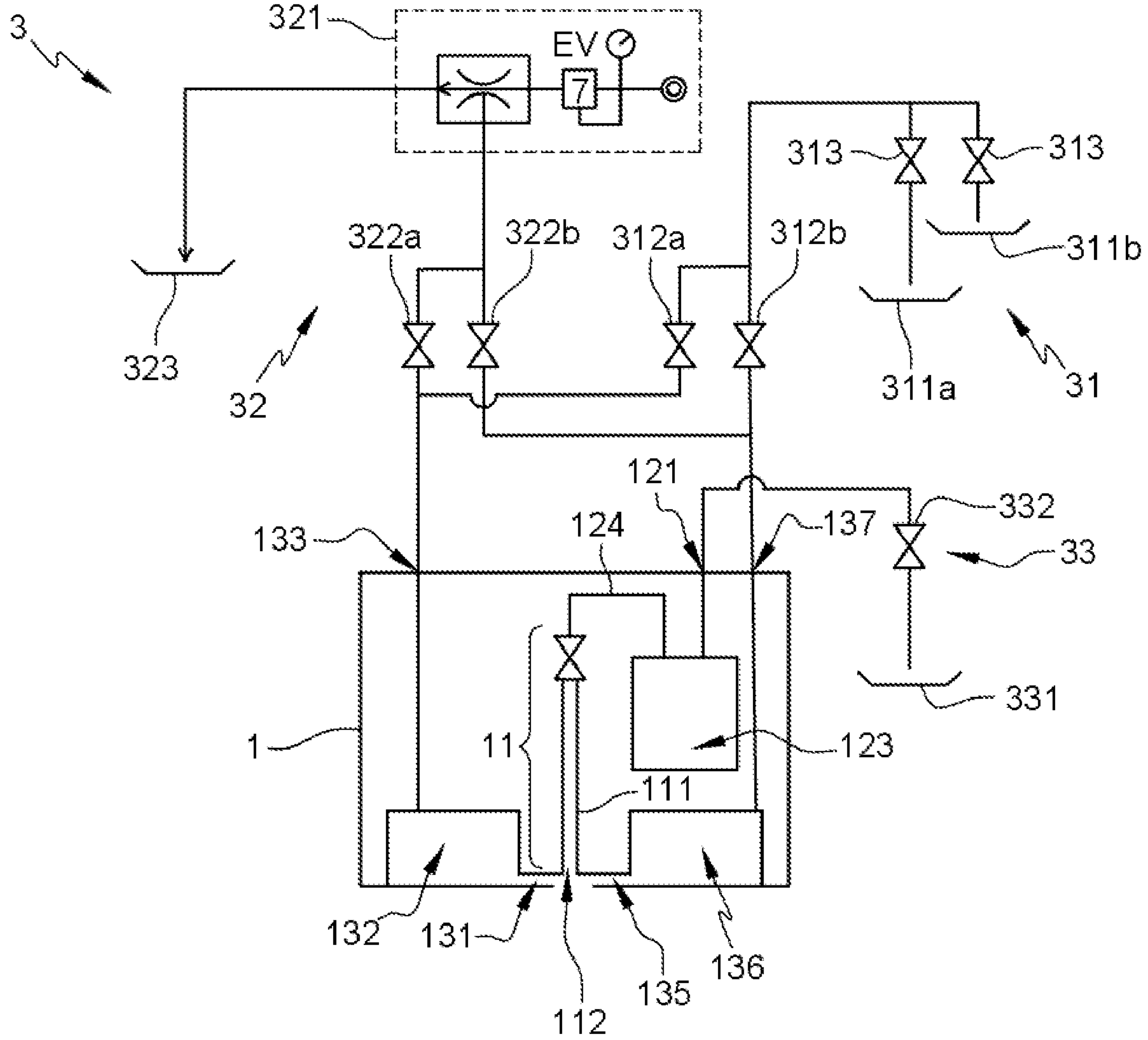
FIG. 7 schematically shows a second embodiment of a coating installation according to the second aspect of the invention.

An installation for the application (or printing) of a coating product over an object to be coated will now be described with reference to FIGS. 6 and 7. FIG. 6 shows a fluidic diagram of a coating installation 3 according to a first embodiment, including print head 1 shown in FIGS. 1A and 1B (or of the variant of the third embodiment). FIG. 7 shows a fluidic diagram of a coating installation 3 according to a second embodiment, including print head 1 shown in FIG. 3 (or in FIG. 5).

In both embodiments, coating installation 3 includes (in addition to print head 1):

- an injection circuit 31 connected to (at least) one inlet of print head 1 and configured for injecting maintenance fluid into print head 1;
- a suction circuit 32 connected to (at least) an outlet of print head 1 and configured for sucking in maintenance fluid from print head 1; and
- a supply circuit 33 for coating product (e.g., paint) connected to supply inlet 121 of feeder circuit 12 of print head 1.

Supply circuit 33 for coating product may include at least one tank 331 for coating product, and at least one so-called filling valve 332 connected to tank 331 for coating product and connected to supply inlet 121 of feeder circuit 12.

Injection circuit 31 (also called supply circuit for maintenance fluid) includes at least one pressurized tank 311 containing maintenance fluid, and at least one so-called injection valve 312 connected to pressurized tank 311 and connected to the inlet of print head 1. “Pressurized” means that pressure inside the tank is higher than atmospheric pressure. Injection circuit 31 may also include means for adjusting pressure of the maintenance fluid. Such means of adjustment may be arranged between pressurized tank 311 and injection valve 312. The means of adjustment include, e.g., a variable flow valve 313. Alternatively, pressure may be adjusted at pressurized tank 311 or even further upstream (compressed air source, pump, etc.). Injection circuit 31 then advantageously includes a two-way valve 313 arranged between pressurized tank 311 and injection valve 312.

Advantageously, injection circuit 31 includes:

- a first pressurized tank 311*a* containing cleaning fluid;
- a second pressurized tank 311*b* containing wetting liquid;
- a first injection valve 312*a* connected to first and second pressurized tanks 311*a* and 311*b* and connected to a first inlet of print head 1; and
- a second injection valve 312*b* connected to first and second pressurized tanks 311*a* and 311*b* and connected to a second inlet of print head 1 (distinct from the first inlet).

The means for adjusting maintenance fluid pressure may then include a variable flow control valve 313 coupled to each of first and second pressurized tanks 311*a* and 311*b*. First and second injection valves 312*a* and 312*b* are preferably two-way valves (such as a pneumatic valve, a solenoid valve, etc.).

Suction circuit 32 includes a vacuum generator 321 (venturi effect system or vacuum pump) and at least one so-called suction valve 322 connected to vacuum generator 321 and connected to the outlet of print head 1. Furthermore, suction circuit 32 advantageously includes a collection volume 323 connected to vacuum generator 321 and intended for collecting maintenance fluid sucked in.

Advantageously, suction circuit 32 includes:

a first suction valve 322*a* connected to vacuum generator 321 and connected to a first outlet of print head 1; and a second suction valve 322*b* connected to vacuum generator 321 and connected to the second outlet of print head 1 (distinct from the first outlet).

First and second suction valves 322*a* and 322*b* are preferably two-way valves (such as a pneumatic valve, a solenoid valve, etc.). Conventionally, vacuum generator 321 may be a venturi effect system including an ejector, a compressed air buffer volume, a pressure gauge and means for adjusting negative pressure generated by vacuum generator 321. Alternatively, vacuum generator 321 may include a vacuum pump arranged above collection volume 323.

In the first embodiment (FIG. 6), first injection valve 312*a* is connected to first inlet-outlet 133 of maintenance circuit 13, and second injection valve 312*b* is connected to supply inlet 121 of feeder circuit 12 (or at purge outlet 122 of feeder circuit 12, not shown in FIG. 6).

Furthermore, first suction valve 322*a* is connected to first inlet-outlet 133 of maintenance circuit 13, and second suction valve 322*b* is connected to supply inlet 121 of feeder circuit 12 (or to purge outlet 122 of feeder circuit 12, not shown in FIG. 6).

In other words, the first outlet of print head 1 and the second inlet of print head 1 are merged with first inlet-outlet 133 of maintenance circuit 13. The second outlet of print head 1 and the first inlet of print head 1 are merged with supply inlet 121 of feeder circuit 12.

In the second embodiment (FIG. 7), first injection valve 312*a* is connected to first inlet-outlet 133 of maintenance circuit 13, and second injection valve 312*b* is connected to second inlet-outlet 137 of maintenance circuit 13.

Furthermore, first suction valve 322*a* is connected to first inlet-outlet 133 of maintenance circuit 13, and second suction valve 322*b* is connected to second inlet-outlet 137 of maintenance circuit 13.

In other words, the first outlet of print head 1 and the second inlet of print head 1 are merged with first inlet-outlet 133 of maintenance circuit 13. The second outlet of print head 1 and the first inlet of print head 1 are merged with second inlet-outlet 137 of maintenance circuit 13.

The two injection valves 312*a* and 312*b*, and the two suction valves 322*a* and 322*b* may be used for carrying out the many maintenance operations described hereinabove.

First injection valve 312*a* and first suction valve 322*a* are advantageously controlled in anti-phase. In other words, when one is open, the other is closed, and vice versa. Second injection valve 312*b* and second suction valve 322*b* are also advantageously controlled in anti-phase.

Advantageously, first injection valve 312*a* is open only when second suction valve 322*b* is open, and second injection valve 312*b* is open only when first suction valve 322*a* is open. Thus, injection of maintenance fluid always takes place at the same time as the suction.

According to a particular cleaning mode, first suction valve 322*a* (second suction valve 322*b*, respectively) is permanently open (continuous suction), and second injection valve 312*b* (first injection valve 312*a*, respectively) is intermittently opened, so as to produce pulses of cleaning fluid.

The two injection valves 312*a* and 312*b* and the two suction valves 322*a* and 322*b* allow cleaning fluid to flow in both directions inside print head 1, thus improving the cleaning operations. In the embodiment, e.g., shown in FIG. 6, cleaning fluid may first be injected via first inlet-outlet 133 and sucked in via supply inlet 121, then injected via supply inlet 121 and sucked in via first inlet-outlet 133 (or in the reverse order).

According to a variant of embodiment, coating installation 3 shown in FIG. 7 further includes a third suction valve connected to vacuum generator 321 and to supply inlet 121, as well as a third injection valve connected to first and second pressurized tanks 311*a* and 311*b* and connected to supply inlet 121. Such variant of embodiment makes it possible to clean (in both directions) nozzles 11 and at least a portion of feeder circuit 12. Cleaning fluid, e.g., may be injected via supply inlet 121 and sucked in via first inlet-outlet 133 and second inlet-outlet 137 (or vice versa).

Body 10 of print head 1 (containing nozzles 11, feeder circuit 12, and maintenance circuit 13) may be manufactured in different ways. Examples include diffusion welding or brazing of metal foils, selective laser sintering of metal powder, micro-molding and silicon microelectromechanical systems (MEMS) manufacturing techniques.

Body 10 may also be composed of machined elements which are assembled by bonding or threading, where a seal may be installed between the different components to provide sealing.

A process for manufacturing body 10 of print head 1 may include:

supply of a plurality of plates, wherein are fitted all or part of the components (channels, chambers, conduits, inlet and/or outlet holes, etc.) of nozzles 11, of feeder circuit 12, and of maintenance circuit 13; and assembly of the plates together, e.g., by means of a welding, brazing or bonding technique.

The plates are preferably made of metal, e.g., of stainless steel. The plates are machined to form the different parts of nozzles 11, of feeder circuit 12, and of maintenance circuit 13, e.g., by chemical cutting, laser cutting or electrical discharge machining (EDM). The plates (also called "strata") preferably have a thickness between 10 μm and 1000 μm.

In a preferred embodiment of the manufacturing process, the metal plates are assembled by diffusion welding. The assembly then includes:

putting the plates in contact so as to form a stack;

pressure constraining of the stack, e.g., between 300 bar and 500 bar; and annealing (or heat treatment) of the pressure-constrained stack, in order to diffuse (or migrate) the atoms of the metal at the interfaces between the plates.

The annealing is preferably performed at a temperature between $0.6T_f$ and $0.8T_f$, where $T_f$ is the melting temperature of the metal. The annealing time may be between 1 h and 3 h.

The surfaces of the plates which are brought into contact preferably have a low surface roughness, typically less than 0.5 μm. The roughness value is expressed as a root-mean-square value.

Such a manufacturing process is precise, simple and rapid to implement (and thus inexpensive). Furthermore, when the diffusion welding technique is used, body 10 produced is robust, because body 10 is finally formed of only one piece (body 10 has a monolithic appearance). The diffusion welding technique is also advantageous in that this technique does not require any additional material (glue, filler metal, etc.) at the interfaces between the metal plates.

The membranes of the pneumatic valves belonging to nozzles 11 (in the case of a DOD head) are advantageously formed after manufacturing of body 10.

The invention claimed is:

1. A print head for applying a coating product to an object to be coated, the print head comprising a body wherein are fitted out:

a plurality of nozzles, each comprising:

an ejection hole; and an outlet channel opening into an ejection zone of the coating product through said ejection hole; and a feeder circuit for the coating product, connected to each nozzle; and a maintenance circuit for conveying a maintenance fluid, the maintenance circuit extending inside said body to the ejection zone of each nozzle, the maintenance circuit comprising a plurality of first internal channels, each first internal channel opening into the ejection zone of a respective nozzle of said plurality of nozzles, the respective nozzle being associated with the first internal channel, the number of first internal channels being equal to the number of said nozzles.

2. The print head according to claim 1, wherein said maintenance circuit further comprises a plurality of second internal channels, each second internal channel being associated with one of said plurality of first internal channels, and opening into the ejection zone of the respective nozzle associated with the first internal channel.

3. The print head according to claim 2, wherein each of said plurality of second internal channels is situated opposite the associated first internal channel with respect to the ejection hole of the nozzle in the ejection zone from which the second channel opens.

4. The print head according to claim 2, wherein each associated first inner channel and second inner channel are oriented along the same direction.

5. The print head according to claim 1, further comprising an ejection face wherein the ejection hole of a nozzle of said plurality of nozzles is fitted, and wherein each of said first internal channels is arranged so that maintenance fluid flows in contact with the ejection face.

6. The print head according to claim 1, comprising an ejection face wherein the ejection hole of a nozzle of said plurality of nozzles is fitted, and wherein each of said first internal channels is arranged in a plate placed over the ejection face.

7. The print head according to claim 1, wherein each of said first internal channels comprises an end open to the ejection zone and situated at a distance less than or equal to 1 mm from the ejection hole of a nozzle of said plurality of nozzles.

8. The print head according to claim 1, wherein the maintenance circuit further comprises a first storage chamber for the maintenance fluid, the first storage chamber communicating with the ejection zone of each nozzle through one of said first internal channels, the length of which is comprised between 0.5 mm and 10 mm.

9. The print head according to claim 8, wherein said first internal channels extend through an internal wall of said body which separates said first storage chamber and the ejection zones from said nozzles.

10. The print head according to claim 1, wherein said maintenance circuit further comprises a first storage chamber for the maintenance fluid, the first storage chamber communicating with the ejection zones of each nozzle through a respective first opening.

11. The print head according to claim 10, wherein each first opening extends through an internal wall of said body that separates said first storage chamber and the ejection zones from said nozzles.

12. The print head according to claim 1, wherein said first internal channels are provided in an external maintenance plate placed over an ejection face of the body, wherein said ejection holes of said nozzles are provided.

13. The print head according to claim 1, wherein said first internal channels have a cross-section with characteristic dimensions less or equal to 0.5 mm.

14. The print head according to claim 13, wherein said first internal channels have a cross-section with characteristic dimensions less or equal to 0.25 mm.

15. A coating installation comprising:

a print head according to claim 1;

an injection circuit for the maintenance fluid of said print head, connected to at least one inlet of said print head; and a suction circuit for the maintenance fluid of said print head, connected to at least one outlet of said print head.

16. The coating installation according to claim 15, wherein said suction circuit comprises:

a vacuum generator;

a first suction valve connected to said vacuum generator and to a first outlet of said print head; and a second suction valve connected to said vacuum generator and to a second outlet of said print head.

17. The coating installation according to claim 15, wherein said injection circuit comprises:

a first pressurized tank containing a cleaning fluid;

a second pressurized tank containing a wetting liquid;

a first injection valve connected to said first and second pressurized tanks and to a first inlet of said print head; and a second injection valve connected to said first and second pressurized tanks and to a second inlet of said print head.

18. A print head for applying a coating product to an object to be coated, the print head comprising a body wherein are fitted out:

a plurality of nozzles, each comprising:

an ejection hole; and an outlet channel opening into an ejection zone of the coating product through said ejection hole; and a feeder circuit for the coating product, connected to each nozzle; and a maintenance circuit for conveying a maintenance fluid, the maintenance circuit extending inside said body to the ejection zone of each nozzle, the maintenance circuit comprising a plurality of first internal channels, each first internal channel opening into the ejection zone of a respective nozzle of said plurality of nozzles, the respective nozzle being associated with the first internal channel, the number of first internal channels being equal to the number of said nozzles, wherein said first internal channels extend through an internal wall of said body which separates said first storage chamber and the ejection zones from said nozzles.

19. A print head for applying a coating product to an object to be coated, the print head comprising a body wherein are fitted out:

a plurality of nozzles, each comprising:

an ejection hole; and an outlet channel opening into an ejection zone of the coating product through said ejection hole; and a feeder circuit for the coating product, connected to each nozzle; and a maintenance circuit for conveying a maintenance fluid, the maintenance circuit extending inside said body to the ejection zone of each nozzle, the maintenance circuit comprising:

a plurality of first internal channels, each first internal channel opening into the ejection zone of a respective nozzle of said plurality of nozzles, the respective nozzle being associated with the first internal channel, the number of first internal channels being equal to the number of said nozzles; and a first storage chamber for the maintenance fluid, the first storage chamber communicating with the ejection zones of each nozzle through a respective first opening.

20. A print head for applying a coating product to an object to be coated, the print head comprising a body wherein are fitted out:

a plurality of nozzles, each comprising:

an ejection hole; and an outlet channel opening into an ejection zone of the coating product through said ejection hole; and a feeder circuit for the coating product, connected to each nozzle; and a maintenance circuit for conveying a maintenance fluid, the maintenance circuit extending inside said body to the ejection zone of each nozzle, the maintenance circuit comprising a plurality of first internal channels, each first internal channel opening into the ejection zone of a respective nozzle of said plurality of nozzles, the respective nozzle being associated with the first internal channel, the number of first internal channels being equal to the number of said nozzles, wherein said first internal channels are provided in an external maintenance plate placed over an ejection face of the body, wherein said ejection holes of said nozzles are provided.

* * * * *